(12) United States Patent
Nellissen et al.

(10) Patent No.: US 10,422,892 B2
(45) Date of Patent: Sep. 24, 2019

(54) PHOTON COUNTING X-RAY DETECTOR

(71) Applicant: KONINKLIJKE PHILIPS N.V., Eindhoven (NL)

(72) Inventors: Antonius Johannes Maria Nellissen, Horst (NL); Frank Verbakel, Helmond (NL); Johan Hendrik Klootwijk, Eindhoven (NL); Herfried Karl Wieczorek, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 581 days.

(21) Appl. No.: 14/647,141

(22) PCT Filed: Nov. 20, 2013

(86) PCT No.: PCT/IB2013/060267
§ 371 (c)(1),
(2) Date: May 26, 2015

(87) PCT Pub. No.: WO2014/087290
PCT Pub. Date: Jun. 12, 2014

(65) Prior Publication Data
US 2015/0301199 A1    Oct. 22, 2015

Related U.S. Application Data

(60) Provisional application No. 61/733,006, filed on Dec. 4, 2012.

(51) Int. Cl.
*G01T 1/24* (2006.01)
*G01T 1/18* (2006.01)
*G01T 1/36* (2006.01)

(52) U.S. Cl.
CPC ........... *G01T 1/241* (2013.01); *G01T 1/18* (2013.01); *G01T 1/24* (2013.01); *G01T 1/247* (2013.01); *G01T 1/366* (2013.01)

(58) Field of Classification Search
None
See application file for complete search history.

(56) References Cited

U.S. PATENT DOCUMENTS 3,824,680 A * 7/1974 Kozlov .............. H01L 31/00
                                                  29/592.1
5,117,114 A * 5/1992 Street ................ G01T 1/2018
                                                  250/370.09
(Continued)

FOREIGN PATENT DOCUMENTS

DE   102011003246 A1    1/2011
DE   102011003246 A1 *  8/2012  ............ G01T 1/24
(Continued)

OTHER PUBLICATIONS

Bale, D. S., et al.; Nature of polarization in wide-bandgap semiconductor detectors under high-flux irradiation: Application to semi-insulating Cd1—xZnxTe; 2008; Physical Review; B77:035205-1-16.
(Continued)

*Primary Examiner* — Andrew Smyth
(74) *Attorney, Agent, or Firm* — Larry Liberchuk

(57) ABSTRACT

The present invention relates to a photon counting X-ray detector and detection method that effectively suppress polarization even under high flux conditions. The proposed detector comprises a photon counting semiconductor element (10) for generating electron-hole pairs in response to incident X-ray photons, a cathode electrode (11*a*, 11*b*; 21*a*, 21*b*; 31*a*, 31*b*, 31*c*, 31*ac*, 31*d*; 41*a*, 41*b*; 51*a*, 51*b*) arranged on a first side (10*a*) of said semiconductor element (10) facing incited X-ray radiation, said cathode electrode comprising two interdigitated cathode elements (11*a*, 11*b*; 21*a*, 21*b*; 31*a*, 31*b*, 31*c*, 31*ac*, 31*d*; 41*a*, 41*b*; 1*a*, 51*b*), a pixelated anode electrode (12) arranged on a second side (10*b*) of said semiconductor element (10) opposite said first
(Continued)

side (10a), a power source (13) for applying a bias voltage between said cathode electrode and said anode electrode and for temporarily applying an injection voltage between said cathode elements (11a, 11b; 21a, 21b; 31a, 31b, 31c, 31ac, 31d; 41a, 41b; 51a, 51b), and a readout unit (14) for reading out electrical signals from said pixelated anode electrode (12).

15 Claims, 5 Drawing Sheets

(56) References Cited

U.S. PATENT DOCUMENTS

| | | | | |
|---|---|---|---|---|
| 5,396,072 | A * | 3/1995 | Schiebel | H01L 27/14659 250/370.09 |
| 5,821,539 | A * | 10/1998 | Matz | H01L 31/115 250/370.01 |
| 5,886,353 | A * | 3/1999 | Spivey | A61B 6/4233 250/208.1 |
| 6,218,668 | B1 * | 4/2001 | Luke | G01T 1/2928 250/370.01 |
| 7,705,319 | B2 * | 4/2010 | Bale | G01T 1/24 250/338.4 |
| 7,800,071 | B2 * | 9/2010 | Shahar | G01T 1/24 250/370.01 |
| 2007/0158574 | A1 | 7/2007 | Petrillo | |
| 2009/0110144 | A1 * | 4/2009 | Takahashi | G01T 1/2928 378/62 |
| 2011/0155918 | A1 * | 6/2011 | Bouhnik | G01T 1/249 250/370.14 |

FOREIGN PATENT DOCUMENTS

| | | | | |
|---|---|---|---|---|
| DE | 102011003246 A1 * | 8/2012 | | G01T 1/24 |
| DE | 102011003246 B4 * | 2/2013 | | G01T 1/24 |
| DE | 102011003246 B4 * | 2/2013 | | G01T 1/24 |
| JP | 09043357 | 2/1997 | | |
| JP | 10056196 | 2/1998 | | |

OTHER PUBLICATIONS

Belas, E., et al.; Electromigration of Mobile Defects in CdTe; 2009; IEEE Trans. on Nuclear Science; 56(4)1752-1757.

Del Sordo, S., et al.; Progress in the Development of CdTe and CdZnTe Semiconductor Radiation Detectors for Astrophysical and Medical Applications; 2009; Sensors; 9(5)3491-3526.

Grill, R., et al.; Polarization Study of Defect Structure of CdTe Radiation Detectors; 2011; IEEE Trans. on Nuclear Science; 58(6)3172-3181.

* cited by examiner

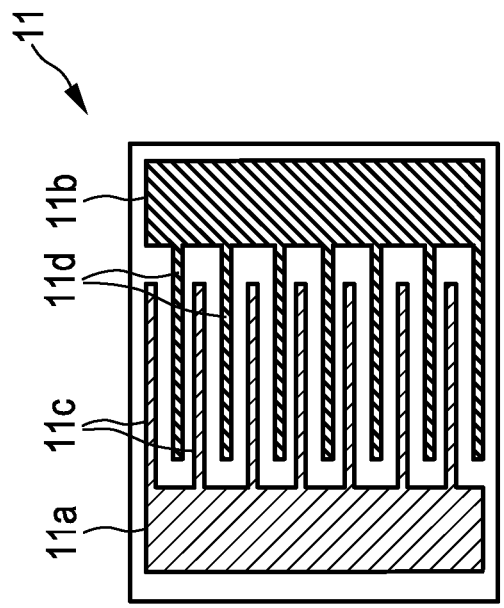
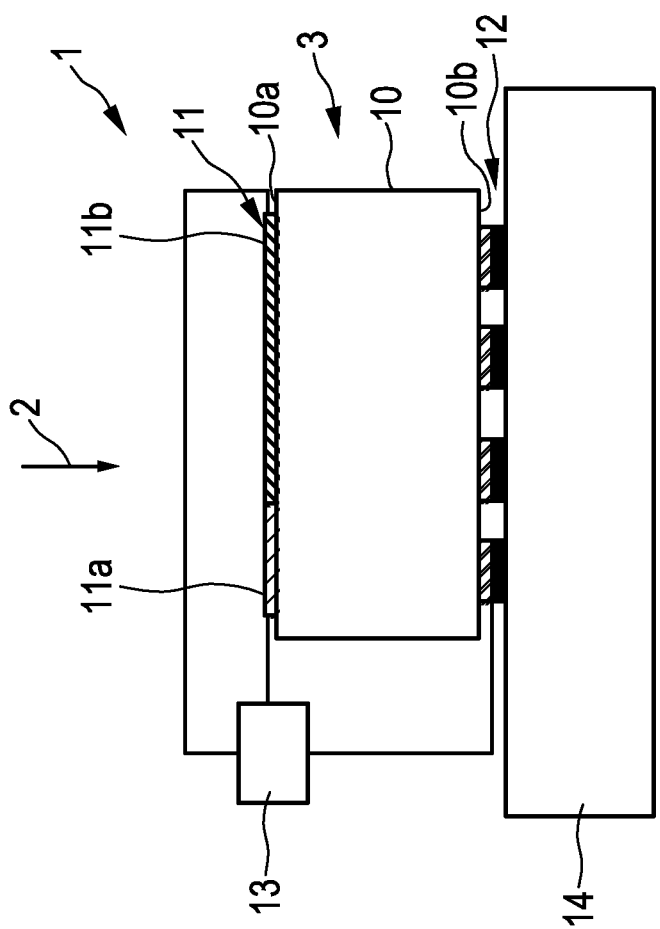

PHOTON COUNTING X-RAY DETECTOR

CROSS REFERENCE TO RELATED APPLICATIONS

This application is a national filing of PCT application Serial No. PCT/IB2013/060267, filed Nov. 20, 2013, published as WO 2014/087290 A1 on Jun. 12, 2014, which claims the benefit of U.S. provisional application Ser. No. 61/733,006 filed Dec. 4, 2012, which is incorporated herein by reference.

FIELD OF THE INVENTION

The present invention relates to a photon counting X-ray detector, a photon counting X-ray detector unit and a photon counting X-ray detection method.

BACKGROUND OF THE INVENTION

Photon counting X-ray detectors (also called direct conversion X-ray detectors) are widely known in the art and are e.g. widely used in CT (Computed Tomography) scanners. Cadmium Telluride (CdTe) and cadmium zinc telluride (CZT) are wide band gap semiconductor materials that are well suited for manufacturing of (high flux) X-ray detectors for astrophysical and medical applications (see e.g. Stefano Del Sordo, Leonardo Abbene, Ezio Caroli, Anna Maria Mancini, Andrea Zappettini and Pietro Ubertini: Progress in the Development of CdTe and CdZnTe Semiconductor Radiation Detectors for Astrophysical and Medical Applications, Sensors 2009, 9, 3491-3526). These types of detectors are very important in applications like solid-state nuclear medicine systems and spectral CT. These applications are based on single photon X-ray counting. The performance of the detector is largely determined by the quality of the crystals (mono crystalline, composition, doping concentration, defect density) and the materials and processes used to form the electrodes on the detector (barrier height of the used metal with respect to semiconductor, contact resistance, sheet resistance, adhesion, etc.). Also mechanical processing and surface preparation (dicing, grinding, polishing and cleaning) and eventually the passivation have a large influence on the final performance.

The performance of CdTe and CZT detectors is often critically disturbed by charging of the bulk material of the detector, which causes local build-up of an internal electric field and counteracts the applied bias voltage. This effect is known as polarization of the detector. Polarisation especially occurs under high flux X-ray exposure conditions and strongly limits the performance of spectral CT photon counting.

U.S. Pat. No. 5,821,539 discloses a direct converting radiation detector with a diode-like (or sandwich-like) structure having first and second operating electrodes on opposite sides of a semiconductor body having an additional injector electrode, which injects charge carriers for the compensating charged traps in the semiconductor body. The secondary dark current generated in this way does not (or minimally) flow via the electrode used for measurement purposes and therefore does not influence the measured signal. The injection is facilitated by suitable doping under the injector electrode.

SUMMARY OF THE INVENTION

It is an object of the present invention to provide to a photon counting X-ray detector, a photon counting X-ray detector unit and a photon counting X-ray detection method that enable suppression of polarization under high flux conditions.

In a first aspect of the present invention a photon counting X-ray detector is presented that comprises:
  a photon counting semiconductor element for generating electron-hole pairs in response to incident X-ray photons,
  a cathode electrode arranged on a first side of said semiconductor element facing incited X-ray radiation, said cathode electrode comprising two interdigitated cathode elements,
  a pixelated anode electrode arranged on a second side of said semiconductor element opposite said first side,
  a power source for applying a bias voltage between said cathode electrode and said anode electrode and for temporarily applying an injection voltage between said cathode elements, and
  a readout unit for reading out electrical signals from said pixelated anode electrode.

In a further aspect of the present invention a photon counting X-ray detector unit is presented that comprises:
  a photon counting semiconductor element for generating electron-hole pairs in response to incident X-ray photons,
  a cathode electrode arranged on a first side of said semiconductor element facing incited X-ray radiation, said cathode electrode comprising two interdigitated cathode elements, said cathode electrode being configured for being coupled to a power source for applying a bias voltage between said cathode electrode and said anode electrode and for temporarily applying an injection voltage between said cathode elements, and
  a pixelated anode electrode arranged on a second side of said semiconductor element opposite said first side, wherein said pixelated anode electrode is configured for being coupled to a readout unit for reading out electrical signals from said pixelated anode electrode,
  wherein said cathode electrode is configured for being coupled to a power source for applying a bias voltage between said cathode electrode and said anode electrode and for temporarily applying an injection voltage between said cathode elements.

In yet a further aspect of the present invention there is provided a photon counting X-ray detection method that comprises:
  subjecting a photon counting X-ray detector unit to incident X-ray radiation leading to the generation of electron-hole pairs in response to incident X-ray photons, said photon counting X-ray detector unit comprising
  a photon counting semiconductor element for generating electron-hole pairs in response to incident X-ray photons,
  a cathode electrode arranged on a first side of said semiconductor element facing incited X-ray radiation, said cathode electrode comprising two interdigitated cathode elements, and
  a pixelated anode electrode arranged on a second side of said semiconductor element opposite said first side,
  applying a bias voltage between said cathode electrode and said anode electrode
  temporarily applying an injection voltage between said cathode elements, and
  reading out electrical signals from said pixelated anode electrode.

Preferred embodiments of the invention are defined in the dependent claims. It shall be understood that the claimed detection method and detector unit have similar and/or identical preferred embodiments as the claimed detector and as defined in the dependent claims.

To suppress polarization of the detector under high flux conditions a special configuration of the cathode electrode, which allows temporal injection of electrons and thereby neutralisation of hole traps that cause polarisation, is proposed according to the present invention. In particular, the proposed cathode electrode comprises two interdigitated cathode elements at which, during short intervals, an injection voltage (e.g. intermittent voltage pulses or a continuous (pulse-like) voltage wave signal) is applied. Said injection voltage has the effect that electrons are temporarily injected into the photon counting semiconductor element. These electrons are moving to the anode electrode due to the applied bias voltage between the cathode electrode and the anode electrode and thus can neutralize occupied hole traps within the photon counting semiconductor element that caused said polarization.

In an embodiment said detector further comprises a control unit for controlling the application of the injection voltage by said power source. Thus, the various parameters of the injection voltage, in particular the intermittent voltage pulses, can be controlled to optimally achieve polarization suppression.

Accordingly, in an embodiment said control unit is configured to control pulse time, shape, duty cycle, repetition frequency and/or voltage amplitude (or any other parameter) of the temporarily applied injection voltage, in particular of intermittent voltage pulses, i.e. to control one or more parameters that have an influence on the polarization suppression and which may also depend on other parameters like the layout and dimensions of the detector, the patterns of the electrodes, the applied voltages, etc.

Further, said control unit is preferably configured to control pulse time, shape, duty cycle, repetition frequency and/or voltage amplitude of the temporarily applied injection voltage based on time-of-flight drift time measurements of electrons moving from said cathode electrode to said anode electrode. Said time-of-flight drift time measurements indicate the time required by electrons to drift from the cathode electrode to the anode electrode and give an indication of the effectiveness of the polarization suppression.

According to still another embodiment said control unit is configured to control said power source and said readout unit to synchronize the application of the temporarily applied injection voltage by said power source and the readout of electrical signal from said pixelated anode electrode such that during the application of the injection voltage no electrical signals are read out from said pixelated anode electrode. Thus, the injected electrons are not counted and the counting result is not falsified.

There are many layouts usable for the arrangement of the interdigitated cathode elements. In a preferred arrangement, said interdigitated cathode elements each comprises a plurality of parallel electrode stripes, wherein the electrode stripes of said interdigitated cathode elements are alternately arranged in parallel. This provides for a good injection of electrons into the semiconductor element. Alternative layouts are e.g. based on a fishbone or spiral structure or a combination of the mentioned structures. Preferably, the interdigitated cathode elements are aligned with respect to the anode electrode which might improve homogeneity between samples, i.e. of injected electrons per pixel.

An even further improvement, in particular due to higher local electrical fields, is achieved by an embodiment in which said electrode stripes comprise sharp tips arranged along said electrode stripes. Preferably, said tips are arranged along said electrode stripes at regular intervals and/or said tips of adjacent electrode stripes are arranged opposite to each other, which further improve the injection of electrons.

In an advantageous embodiment said power source comprises an induction unit comprising a primary coil coupled between said two interdigitated cathode elements and a secondary coil, a DC voltage source for applying said bias voltage to said primary coil, and a current source for applying intermittent signals, in particular current pulses, to said secondary coil to generate said temporarily applied injection voltage across said primary coil. This provides for a simple way of applying the required voltages to the cathode elements and the anode. With this set-up it is generally easier to keep the average main electric field between anode electrode and cathode electrode constant. Applying separate voltage sources is alternatively possible, but may require measures to guarantee that the average main electric field between anode electrode and cathode electrode constant.

Preferably, said power source is configured to temporarily apply said injection voltage between said cathode elements with alternating polarity. This avoids local polarization within the semiconductor element.

In another embodiment said power source is configured to apply an injection voltage after a predetermined maximum time. Thus, after said maximum time a reset of the semiconductor material is made by injecting electrons to neutralize all hole traps that have been formed so far.

Preferably, said cathode electrode comprises a plurality of cathode elements, wherein two cathode elements are interdigitated respectively, and wherein said power source is configured to selectively temporarily apply an injection voltage to said pairs of interdigitated cathode elements. Thus, the injection of electrons to different portions of the detector can be individually controlled for the different portions by controlling the injection voltage applied to the pairs of interdigitated cathode elements covering said different portions.

Still further, in an embodiment said readout unit is configured to correct read out electrical signals depending on the parameters of temporarily applied injection voltage, in particular depending on the timing and duration of the temporarily applied injection voltage. Thus, the accuracy of the obtained photon counting result is increased. In still another embodiment a feedback loop is provided that reads polarization and then only give a voltage pulse when needed.

BRIEF DESCRIPTION OF THE DRAWINGS

These and other aspects of the invention will be apparent from and elucidated with reference to the embodiment(s) described hereinafter. In the following drawings FIG. 1 shows a schematic diagram of a first embodiment of a photon counting X-ray detector according to the present invention, FIG. 2 shows a top view of a first embodiment of a cathode electrode according to the present invention.

DETAILED DESCRIPTION OF THE INVENTION

Figure 3:
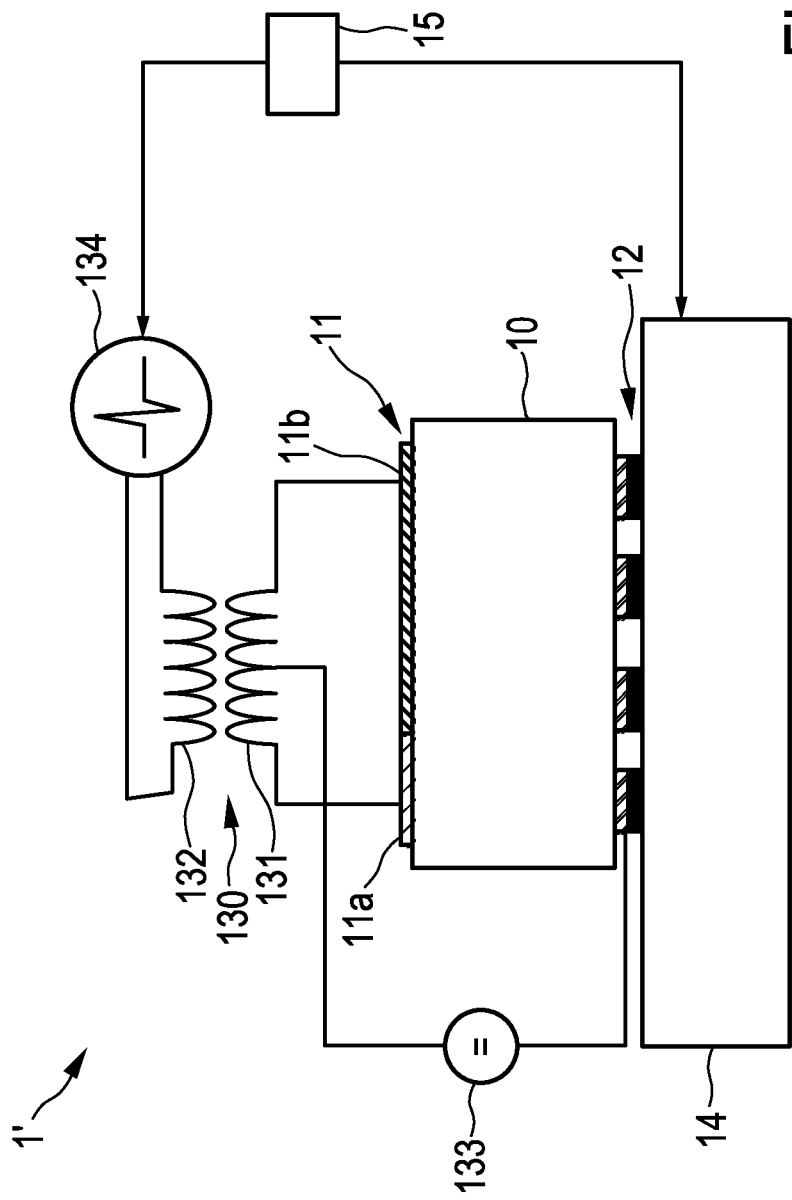
FIG. 3 shows a schematic diagram of a second embodiment of a photon counting X-ray detector according to the present invention.

FIG. 1 shows a schematic diagram of a first embodiment of a photon counting X-ray detector 1 according to the present invention. It comprises a photon counting semiconductor element 10 for generating electron-hole pairs in response to incident X-ray photons 2, a cathode electrode 11 arranged on a first side 10a of said semiconductor element 10 facing incident X-ray radiation 2 and a pixelated anode electrode 12 arranged on a second side 10b of said semiconductor element 10 opposite said first side 10a.

As clearly shown in the top view of the cathode electrode 11 depicted in FIG. 2 the cathode electrode 11 comprises two interdigitated cathode elements 11a, 11b. Said interdigitated cathode elements 11a, 11b each comprise a plurality of parallel electrode stripes 11c, 11d which are alternately arranged in parallel.

The semiconductor element 10, the cathode electrode 11 and the anode electrode 12 thus form a photon counting X-ray detector unit 3 which may be used with various electronics for providing voltage and/or current signals and for reading out signals.

The photon counting X-ray detector 1 further comprises a power source 13 for applying a bias (DC) voltage between said cathode electrode 11 and said anode electrode 12 and for temporarily applying an injection voltage between said cathode elements 11a, 11b. Still further, a readout unit 14 is provided for reading out electrical signals from said pixelated anode electrode 12.

In the following explanation as example for the injection voltage intermittent (temporary) voltage pulses will be considered. In practice, voltage wave signals can alternatively used as temporarily applied injection voltage.

In a preferred embodiment of the X-ray detector 1' shown in FIG. 3 said semiconductor element 10 comprises a CdZnTe detector crystal (also called CZT detector crystal). For both the interdigitated electrode pattern 11 at the cathode side and the pixelated electrode pattern 12 at the anode side a metal is preferably chosen with a high potential barrier towards CdZnTe causing blocking contacts. For instance, for n-type CZT platinum and for p-type CZT (and CdTe) indium or aluminum is used as blocking (Schottky) contact.

In this embodiment the power unit comprises an induction unit 130 comprising a primary coil 131 coupled between said two interdigitated cathode elements 11a, 11b and a secondary coil 132. A DC voltage source 133 is provided for applying said bias voltage to said primary coil 131, and a current source 134 is provided for applying intermittent current pulses to said secondary coil 132 to generate said intermittent voltage pulses across said primary coil 131. Thus, the cathode electrode 11 is connected via the induction coil 131 to a bias voltage in the range from −0.1 kV to −10 kV, e.g. −1 kV, and the anode pixels of the anode electrode 12 are connected to the readout chip 14. In this way an electric field is created over the detector crystal 10 in the order of 100-500 V/mm, preferably 200-400, e.g. 300 V/mm.

Generally, in a photon counting X-ray detector an absorbed X-ray photon generates a cloud of electron-hole pairs in the semiconductor element 10. Due to the existence of the electric field the electrons move towards the anode electrode 12 and are collected by the readout unit 14. In this way energy, location and timing of each incident photon is registered. The generated holes move towards the cathode electrode 11. Holes have a much lower mobility than electrons and can be trapped easily in hole traps. This causes polarization of the detector and occurs especially under high flux X-ray exposure conditions. Polarization may lead to complete failure of the photon counting method.

In order to suppress polarization the trapped holes must be neutralized. This is achieved according to the present invention by temporal injection of electrons at the cathode electrode 11. Under normal operation conditions the cathode contact is blocking, resulting in a low dark current level, which is very advantageous. Temporal injection of electrons is initiated by a short voltage pulse between said cathode elements 11a, 11b, caused e.g. by a short current pulse through the secondary coil 132 of the induction unit 131 in the second embodiment of the X-ray detector 1' shown in FIG. 3. This current pulse induces a high voltage difference (field) between the two adjacent stripes 11c, 11d (also called legs) of the interdigitated cathode electrode 11, which will force electrons to move into the semiconductor element 10 even though blocking contacts are used. Once the electrons are forced into the semiconductor element 10, they drift towards the anode electrode 12 because of the applied bias voltage and can thus neutralize occupied hole traps (or, to be more precise, trapped holes) within the semiconductor element 10. This in turn suppresses polarization of the detector.

Optionally, a control unit 15 is additionally provided, as shown in FIG. 3, for controlling the application of the intermittent voltage (polarization suppression) pulses by said voltage source 134 (or, generally, by the power source 13). Particularly pulse time, shape, duty cycle, repetition frequency and/or voltage amplitude of the intermittent voltage pulses (or any other parameter of an applied injection voltage) as applied by said power source can thus be controlled to optimize the suppression of polarization. Preferably, one or more of these parameters are controlled taking into account the given X-ray exposure dose.

Further, by use of the control unit 15 the readout unit 14 can be synchronized with the polarization suppression pulse. Thus, care is taken that the injected electrons are not counted. Another advantage of this control unit is that the high anode-to-cathode DC voltage is only slightly changed during the short pulse time. The main electric field is hardly disturbed.

The effectiveness of polarization suppression or the degree of polarization of the semiconductor element 10 can be derived from time-of-flight (drift time) measurements indicating the time necessary for electrons to move from the cathode electrode 11 to the anode electrode 12.

Figure 4:
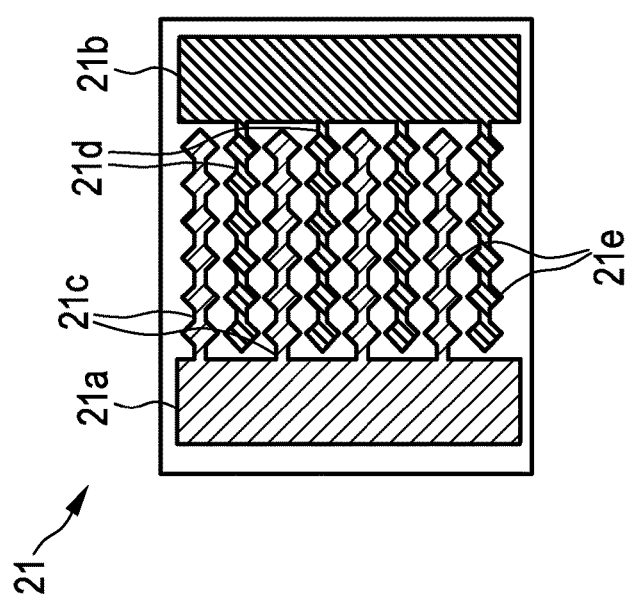
FIG. 4 shows a top view of a second embodiment of a cathode electrode according to the present invention.

There are many variations possible on the pattern layout of the cathode pattern (i.e. layout of the cathode elements 11a, 11b) and the materials used and on the ways to generate the temporal high electric field to inject electrons. A variation on pattern layout is depicted in FIG. 4 showing a top view of another embodiment of a cathode electrode 21. This cathode electrode 21 comprises two cathode elements 21a, 21b, wherein sharp tips 21e are attached at regular distances along the straight legs 21c, 21d of the interdigitated structure on the cathode pattern. This results in even higher local electrical fields which facilitates injection of electrons.

Preferably, in an embodiment positive and negative voltage pulses are alternately applied at the interdigitated cathode elements 11a, 11b to avoid local (lateral) polarization and electromigration.

The timing of the voltage pulses is preferably controlled. When a voltage pulse is only approximately 100 psec to 1 nsec (or max. 10 nsec) long, many electrons may be injected and then slowed down under 'standard' electric field conditions so that they have time for recombination with trapped holes. This avoids a long 'dead' time for the detector.

In an embodiment a maximum time is defined after which such a 'reset' voltage pulse is applied to the cathode elements 11a, 11b. This time may depend on illumination conditions (i.e. on the incident radiation). For instance, a look-up table can be used to define, e.g. depending on X-ray flux, the time for a reset. This look-up table can be stored in the control unit 15 or in a separate storage unit (not shown) that can be accessed by the control unit 15.

Figure 5:
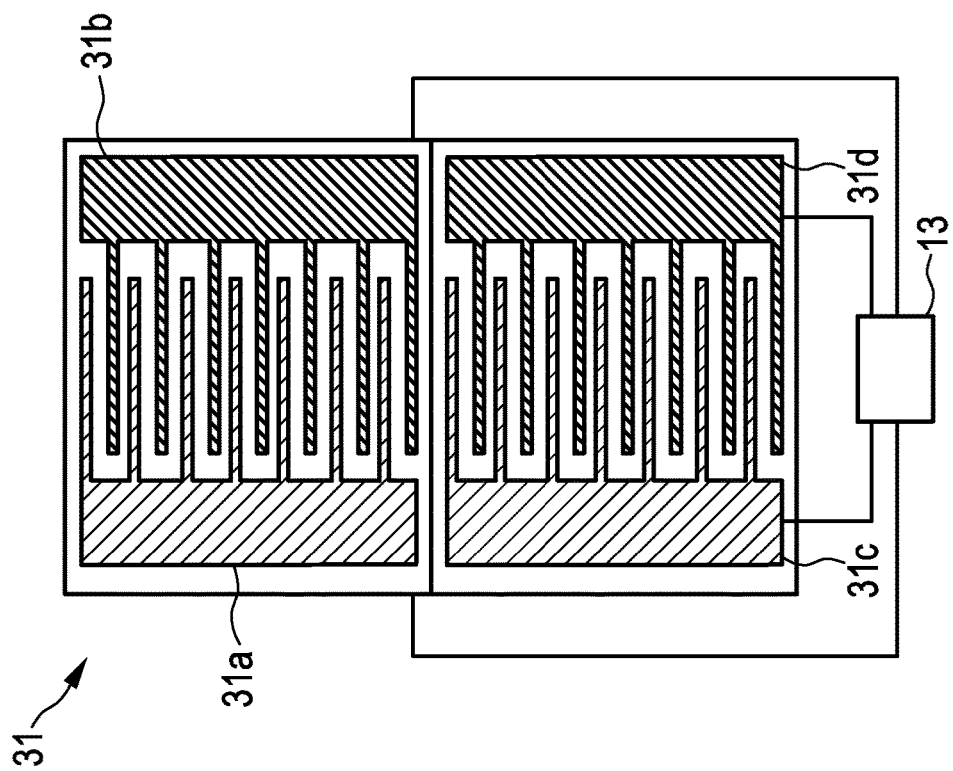
FIG. 5 shows a top view of a third embodiment of a cathode electrode according to the present invention.

Another embodiment of a cathode electrode 31 is shown in FIG. 5. In this embodiment the cathode electrode 31 comprises a plurality of cathode elements 31a, 31b, 31c, 31d, wherein two cathode elements are interdigitated respectively. For instance the cathode elements 31a, 31b are interdigitated and the cathode elements 31c, 31d are interdigitated. The power source 13 is configured to selectively apply intermittent voltage pulses to said pairs of interdigitated cathode elements 31a, 31b, 31c, 31d. Thus, the control of the application of the voltage pulses can be done differently for different parts of the detector, e.g. for different detector modules (each comprising e.g. a pair of cathode elements). This may be used to avoid a reset in low-flux regions, aiming at maximum signal there, while in high-flux regions part of the signal may be lost during the reset phase.

Figure 7:
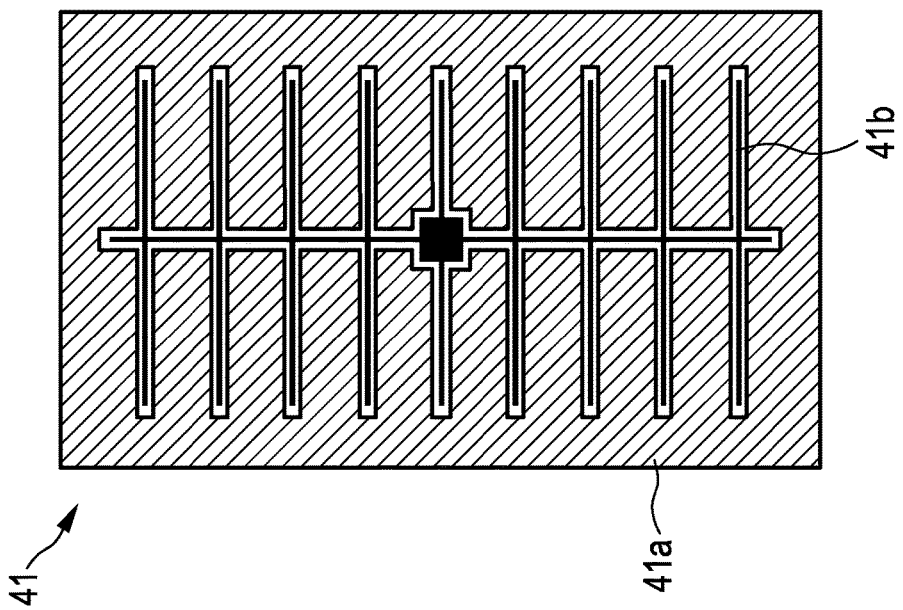
FIG. 7 shows a top view of a fourth embodiment of a cathode electrode according to the present invention.
Figure 6:
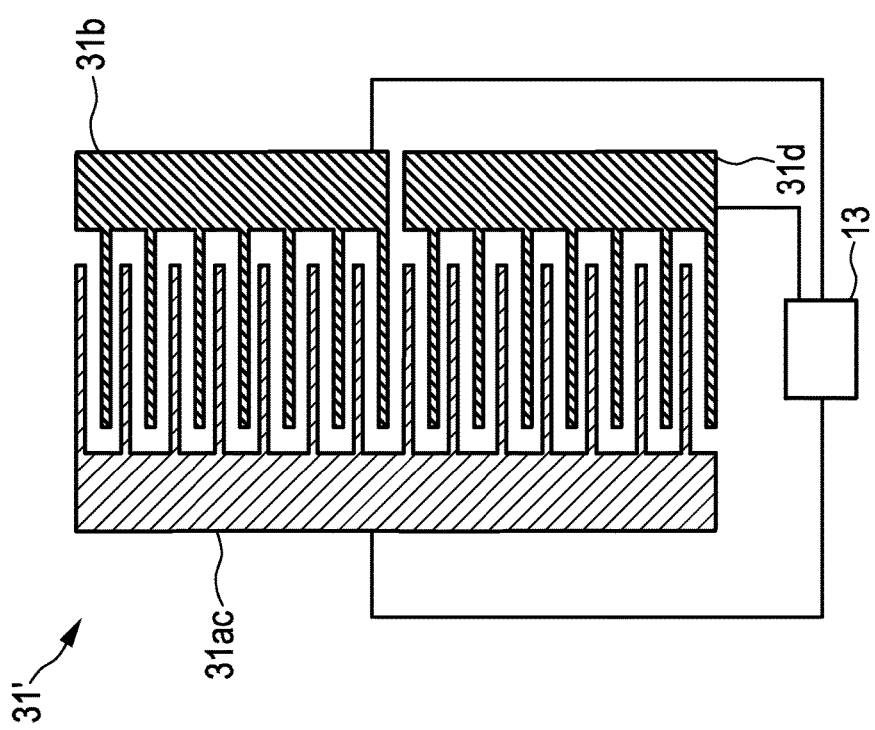
FIG. 6 shows a top view of a third embodiment of a cathode electrode according to the present invention.

There are further variations for the arrangement, pattern and number of cathode elements that can be used in a detector according to the present invention. For instance, in a variation of the embodiment shown in FIG. 5, the cathode elements 31a and 31c are combined into a common cathode element which also enables to separately apply voltage pulses to the pairs 31ac, 31b and 31ac, 31d (31ac representing the common cathode element of cathode elements 31a and 31c). Such a cathode electrode 31' is shown in FIG. 7.

Figure 9:
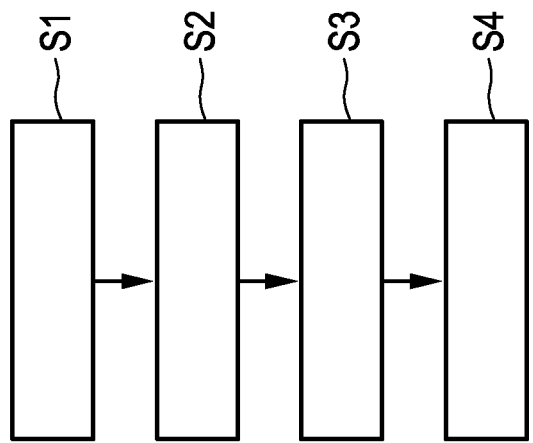
FIG. 9 shows a flowchart of a photon counting method according to the present invention.
Figure 8:
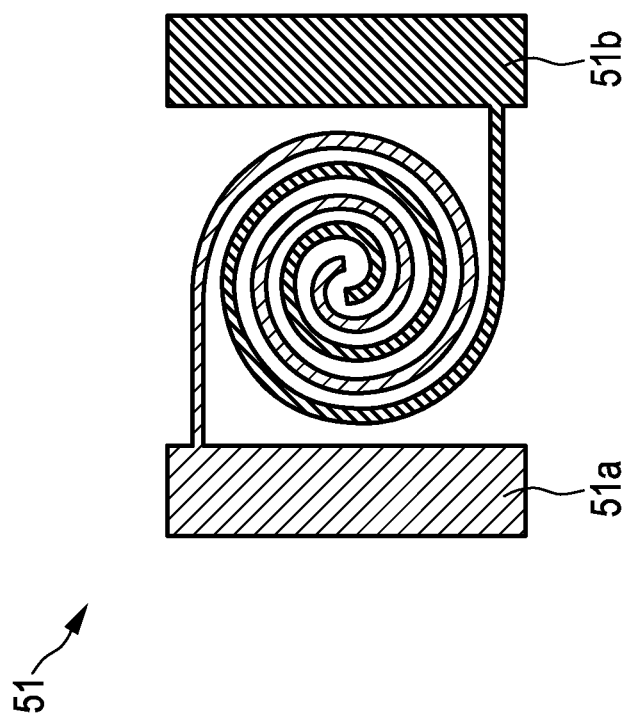
FIG. 8 shows a top view of a fifth embodiment of a cathode electrode according to the present invention.

Still further embodiments of cathode patterns are shown in FIGS. 8 and 9. In the embodiment shown in FIG. 8 the cathode electrode 41 comprises cathode elements 41a and 41b formed as a fishbone structure. In the embodiment shown in FIG. 9 the cathode electrode 51 comprises cathode elements 51a and 51b formed as a spiral structure.

Generally, it is preferred that the cathode elements are aligned with respect to the anode electrode to achieve homogeneity of the injected electrons per pixel.

In another embodiment the readout unit 14 is configured to correct read out electrical signals (of the anode pixels) depending on the parameters of applied intermittent voltage pulses, in particular depending on the timing and duration of applied intermittent voltage pulses. In this way the accuracy of the counting result is increased. This can e.g. be implemented by use a look-up table to store the impact of different intermittent voltage pulses (rep. frequency, amplitude etc.) on the read out signals (signal height, offsets due to extra charge injected, non-linearities, etc.).

In still another embodiment the legs (or stripes) of the interdigitated cathode elements of the cathode electrode are made of different material. One cathode element is made of a high barrier metal that yields a blocking contact (e.g. Pt) and the other cathode electrode is made of a low barrier metal that yields an ohmic contact (e.g. In). Semi-injecting is also possible (e.g. Cr, Ag), in which case less electrons are injected. During photon counting only the high barrier cathode electrode is connected, which provides low dark current because of blocking contact. During the "reset" period also the low barrier cathode electrode is connected which causes temporal injection of electrons which suppresses polarization. A fast switch is used to switch the low barrier leg on and off.

An embodiment of a photon counting X-ray detection method according to the present invention is shown as flowchart in FIG. 9. Said method comprises the following steps. In a first step S1 a photon counting X-ray detector unit (as e.g. depicted in FIG. 1 as detection unit 3) is subjected to incident X-ray radiation leading to the generation of electron-hole pairs in response to incident X-ray photons. In a second step S2 a bias voltage is applied between said cathode electrode and said anode electrode. In a third step S3 voltage pulses are intermittently applied between said cathode elements. In a fourth step S4 electrical signals read out from said pixelated anode electrode.

With the detector, detector unit and detection method according to the present invention suppression of polarization under high flux conditions can be reliably and effectively obtained and the accuracy of photon counting results can be increased.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A photon counting X-ray detector unit comprising:
   a photon counting semiconductor element for generating electron-hole pairs in response to incident X-ray photons;
   a cathode electrode arranged on a first side of said semiconductor element facing incited X-ray radiation, said cathode electrode comprising two interdigitated cathode elements; and
   a pixelated anode electrode arranged on a second side of said semiconductor element opposite said first side, wherein said pixelated anode electrode is configured for being coupled to a readout unit for reading out electrical signals from said pixelated anode electrode,
   wherein said photon counting X-ray detector unit is configured to drift charge carriers from said cathode electrode towards said anode electrode in response to an applied bias voltage between said anode electrode and said cathode electrode and to temporarily inject charge carriers between said cathode elements in response to a temporarily applied injection voltage between said cathode elements.

2. The photon counting X-ray detector unit as claimed in claim 1, wherein said interdigitated cathode elements each comprises a plurality of parallel electrode stripes, wherein the electrode stripes of said interdigitated cathode elements are alternately arranged in parallel.

3. The photon counting X-ray detector unit as claimed in claim 2, wherein said electrode stripes comprise sharp tips arranged along said electrode stripes, along said electrode stripes at regular intervals.

4. The photon counting X-ray detector unit as claimed in claim 3, wherein said tips of adjacent electrode stripes are arranged opposite to each other.

5. A photon counting X-ray detector comprising:
   a photon counting X-ray detector, comprising:
      a cathode electrode arranged on a first side of said semiconductor element facing incited X-ray radiation, said cathode electrode comprising two interdigitated cathode elements; and
      a pixelated anode electrode arranged on a second side of said semiconductor element opposite said first side;
   a power source for applying a bias voltage between said cathode electrode and said anode electrode and for temporarily applying an injection voltage carriers between said cathode elements, and
   a readout unit for reading out electrical signals from said pixelated anode electrode,
   wherein said photon counting X-ray detector is configured to drift charge carriers from said cathode electrode towards said anode electrode in response to the applied bias voltage between said anode electrode and said cathode electrode and to temporarily inject charge carriers between said cathode elements in response to the temporarily applied injection voltage between said cathode elements.

6. The photon counting X-ray detector as claimed in claim 5, wherein said power source is configured to temporarily apply intermittent voltage pulses or continuous voltage wave signals between said cathode elements.

7. The photon counting X-ray detector as claimed in claim 5, further comprising a control unit for controlling the application of the temporarily applied injection voltage by said power source for controlling a pulse time, a shape, a duty cycle, a repetition frequency and/or a voltage amplitude of intermittent voltage pulses applied as injection voltage.

8. The photon counting X-ray detector as claimed in claim 6, wherein said control unit is configured to control the pulse time, the shape, the duty cycle, the repetition frequency and/or the voltage amplitude of the temporarily applied injection voltage based on time-of-flight drift time measurements of electrons moving from said cathode electrode to said anode electrode.

9. The photon counting X-ray detector as claimed in claim 6, wherein said control unit is configured to control said power source and said readout unit to synchronize the application of the temporarily applied injection voltage by said power source and the readout of electrical signal from said pixelated anode electrode by disabling the readout unit during the application of a temporarily applied injection voltage.

10. The photon counting X-ray detector as claimed in claim 5, wherein said power source comprises
   an induction unit comprising a primary coil coupled between said two interdigitated cathode elements and a secondary coil;
   a DC voltage source for applying said bias voltage to said primary coil; and
   a current source for temporarily applying intermittent current signals, including current pulses, to said secondary coil to generate said temporarily applied injection voltage across said primary coil.

11. The photon counting X-ray detector as claimed in claim 5, wherein said power source is configured to temporarily apply said injection voltage between said cathode elements with alternating polarity.

12. The photon counting X-ray detector as claimed in claim 5, wherein said power source is configured to apply an injection voltage after a predetermined maximum time.

13. The photon counting X-ray detector as claimed in claim 5, wherein said cathode electrode comprises a plurality of cathode elements, wherein two cathode elements are interdigitated respectively, and wherein said power source is configured to selectively temporarily apply an injection voltage to pairs of interdigitated cathode elements.

14. The photon counting X-ray detector as claimed in claim 5, wherein said readout unit is configured to correct read out electrical signals depending on the parameters of the temporarily applied injection voltage depending on the timing and duration of temporarily applied injection voltage.

15. A photon counting X-ray detection method comprising:
   subjecting a photon counting X-ray detector unit to incident X-ray radiation leading to the generation of electron-hole pairs in response to incident X-ray photons, said photon counting X-ray detector unit comprising
   a photon counting semiconductor element for generating electron-hole pairs in response to incident X-ray photons; and
   a cathode electrode arranged on a first side of said semiconductor element facing incited X-ray radiation, said cathode electrode comprising two interdigitated cathode elements; and
   a pixelated anode electrode arranged on a second side of said semiconductor element opposite said first side;
   applying a bias voltage between said cathode electrode and said anode electrode;
   temporarily applying an injection voltage between said cathode elements; and
   reading out electrical signals from said pixelated anode electrode.

* * * * *